US012160048B2

(12) United States Patent
Ichihara et al.

(10) Patent No.: US 12,160,048 B2
(45) Date of Patent: Dec. 3, 2024

(54) ANTENNA MODULE THAT CAN BE MOUNTED ON ELECTRONIC APPLIANCES

(71) Applicant: PANASONIC INTELLECTUAL PROPERTY MANAGEMENT CO., LTD., Osaka (JP)

(72) Inventors: Takashi Ichihara, Kanagawa (JP); Yutaka Furukawa, Tokyo (JP); Tomohiro Ukai, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 129 days.

(21) Appl. No.: 18/100,843

(22) Filed: Jan. 24, 2023

(65) Prior Publication Data

US 2023/0268672 A1 Aug. 24, 2023

(30) Foreign Application Priority Data

Feb. 18, 2022 (JP) ................................ 2022-024207

(51) Int. Cl.

*H01Q 1/22* (2006.01)
*H01Q 1/48* (2006.01)
*H01Q 9/04* (2006.01)
*H01Q 25/00* (2006.01)

(52) U.S. Cl.

CPC ............ *H01Q 25/002* (2013.01); *H01Q 1/48* (2013.01); *H01Q 9/045* (2013.01)

(58) Field of Classification Search

CPC ........ H01Q 1/12; H01Q 1/22-24; H01Q 1/48; H01Q 1/52; H01Q 5/30-40; H01Q 25/00
See application file for complete search history.

(56) References Cited

U.S. PATENT DOCUMENTS

| | | | | |
|---|---|---|---|---|
| 6,924,776 | B2 * | 8/2005 | Le | H01Q 3/30 343/810 |
| 11,949,151 | B2 * | 4/2024 | Hwang | H01Q 1/32 |
| 2017/0069950 | A1 * | 3/2017 | Kim | H01Q 1/32 |
| 2021/0036410 | A1 | 2/2021 | Fujii et al. | |

FOREIGN PATENT DOCUMENTS

| | | |
|---|---|---|
| JP | 2021-22855 | 2/2021 |

* cited by examiner

*Primary Examiner* — Hasan Islam
(74) *Attorney, Agent, or Firm* — GREENBLUM & BERNSTEIN, P.L.C.

(57) ABSTRACT

A first antenna and a second antenna provided on a front surface of the resin plate. A first cable connects the first antenna and a communication board. The first cable is mounted on a first mounting bracket. A second cable connects the second antenna and a communication board. The second cable is mounted on a second mounting bracket. The first mounting bracket is provided on at least one of the front surface of the resin plate and the first ground plate of the first antenna. The second mounting bracket is provided on at least one of the front surface of the resin plate and the second ground plate of the second antenna.

6 Claims, 7 Drawing Sheets

350b

350b

ANTENNA MODULE THAT CAN BE MOUNTED ON ELECTRONIC APPLIANCES

BACKGROUND

1. Field

The present disclosure relates to antenna modules and, more particularly, to an antenna module that can be mounted on electronic appliances.

2. Description of the Related Art

When an electronic appliance such as a vehicle-mounted appliance is provided with a communication function, an antenna is mounted on the housing (see, for example, patent literature 1).

[Patent literature 1] JP2021-22855

When a cable is connected to the antenna mounted on the housing, a mounting bracket for securing the cable is provided in the housing. When the mounting bracket is formed by cutting work on the surface of the housing, a through hole is produced in the housing. In the presence of a through hole, the interfering wave produced in the vehicle cabin could affect the circuit inside the housing.

SUMMARY

The present disclosure addresses the situation described above, and a purpose thereof is to provide a technology for reducing the impact from the interfering wave on the housing interior.

An antenna module according to an embodiment of the present disclosure includes: a resin plate structured and arranged to be mounted on a front plate of a housing from a front side; a first antenna and a second antenna provided on a front surface of the resin plate; a first cable that connects the first antenna and a communication board; a first mounting bracket on which the first cable is mounted; a second cable that connects the second antenna and the communication board; and a second mounting bracket on which the second cable is mounted. The first antenna includes: a first ground plate connected to the front surface of the resin plate; a first upright wall provided to stand from the first ground plate toward the front side; and a first radiation plate connected to the first upright wall. The second antenna includes: a second ground plate connected to the front surface of the resin plate; a second upright wall provided to stand from the second ground plate toward the front side; and a second radiation plate connected to the second upright wall. The first mounting bracket is provided on at least one of the front surface of the resin plate and the first ground plate, and the second mounting bracket is provided on at least one of the front surface of the resin plate and the second ground plate.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

A brief summary will be given before describing the present disclosure in specific details. The embodiment relates to an electronic appliance covered by a metal housing and provided with an antenna for wireless communication. An example of the electronic appliance is a vehicle-mounted appliance that can be mounted on a vehicle, etc. For wireless communication, wireless local area network (LAN) or Bluetooth (registered trademark) is used by way of example. A dual band antenna compatible with 2.4 GHz/5 GHz is used for communication in the 2.4 GHz band for Bluetooth (registered trademark) and communication in the 2.4 GHz/5 GHz band for wireless LAN. In the related art, the antenna compatible with Bluetooth (registered trademark) and wireless LAN in the 5 GHz band and an antenna compatible with wireless LAN in the 2.4 GHz band and the 5 GHz band are provided separately such that they are spaced apart from each other. In such a configuration, the antennas alone are plate-like components that can be deformed easily and are transported in two packages. Also, a wiring work for wiring the cable is necessary after the antennas are mounted. Evaluation of the antenna performance is difficult unless the antennas are mounted. Further, it is necessary to provide the housing with a mounting bracket for securing the cable when the antennas are mounted on the front side of the housing. By providing the mounting bracket in the housing by cutting work, a through hole is produced in the housing. In the presence of a through hole, the interfering wave produced in the vehicle cabin could affect the circuit inside the housing.

The embodiment provides an antenna module in which two antennas are mounted on a resin plate, and the cable connected to each antenna is mounted on the antenna or the resin plate. Modularization increases the strength of the antenna makes it possible to transport the antennas in one package. It also makes unnecessary the wiring work for wiring the cable after the antenna module is mounted on the housing. The antenna performance can be evaluated in the antenna module alone. Mounted the cable on the resin plate leaves the housing free of through holes so that the circuit inside the housing is less likely to be affected by the interfering wave produced in the vehicle cabin.

The terms "parallel" and "orthogonal" in the following description not only encompass completely parallel or orthogonal but also encompass slightly off-parallel and slightly non-orthogonal within the margin of error. The term "substantially" means identical within certain limits.

Figure 1:
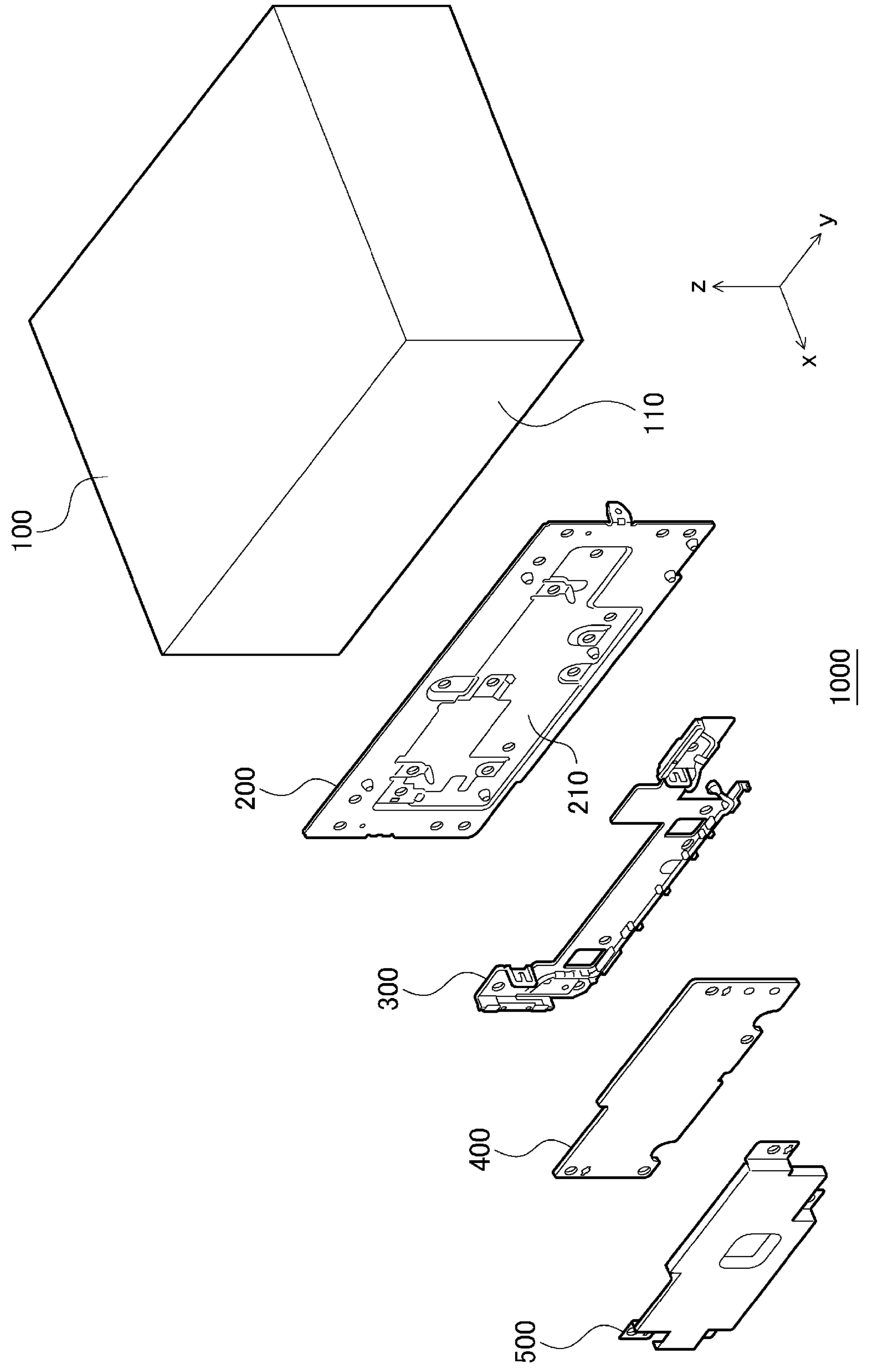
FIG. 1 is an exploded perspective view showing the structure of an electronic appliance according to the embodiment.
Figure 2:
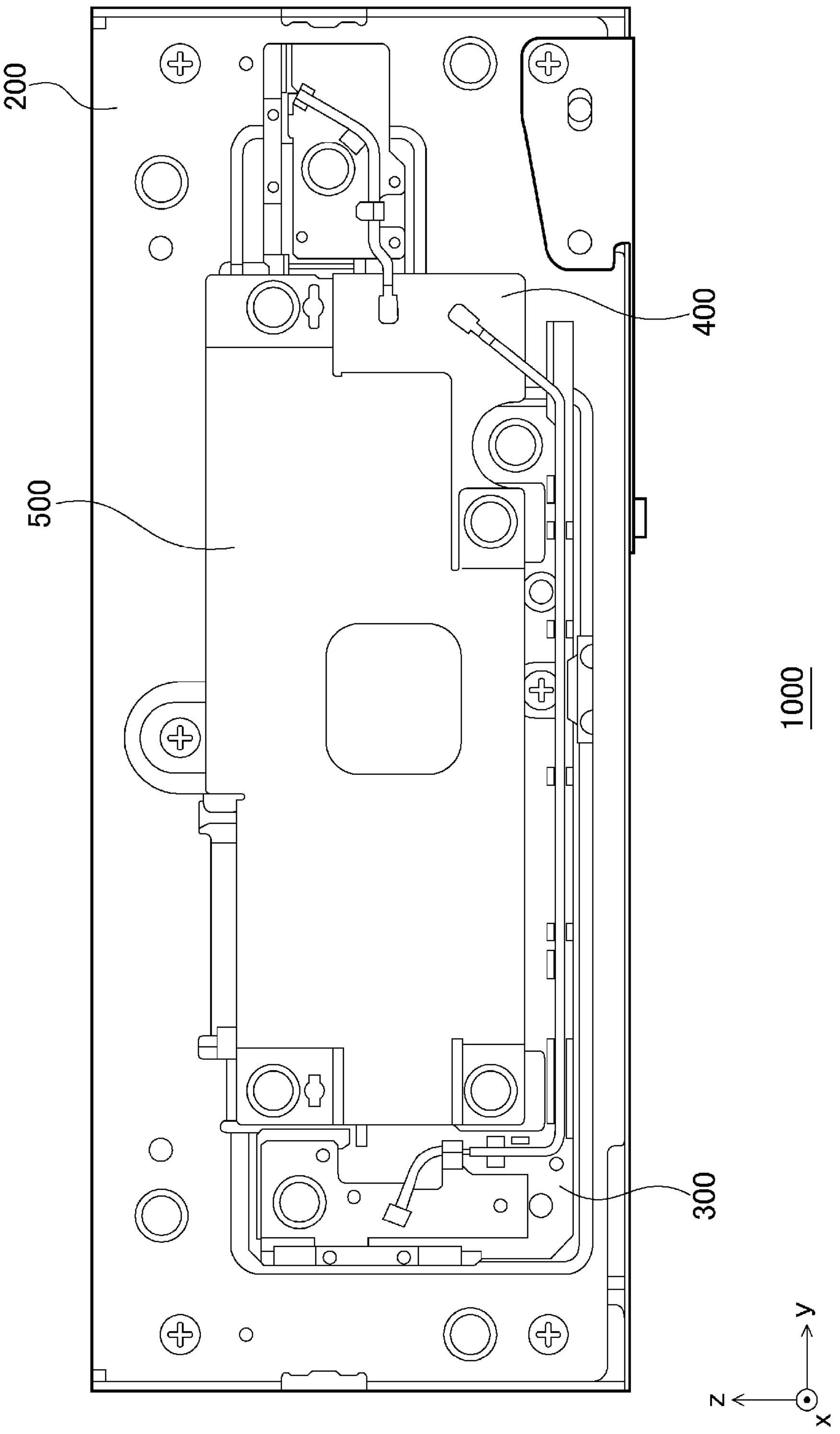
FIG. 2 is a font view revealed when the front side of the electronic appliance of FIG. 1 is seen.

FIG. 1 is an exploded perspective view showing the structure of an electronic appliance 1000. FIG. 2 is a font view revealed when the front side of the electronic appliance 1000 of FIG. 1 is seen. As shown in FIG. 1, an orthogonal coordinate system formed by an x axis, y axis, and z axis is defined. The x axis and y axis are orthogonal to each other. The z axis is perpendicular to the x axis and y axis and extends in the direction of height of the electronic appliance 1000. The positive directions of the x axis, y axis, and z axis are defined in the directions of arrows in FIG. 1, and the negative directions are defined in the directions opposite to those of the arrows. The positive direction of the x axis may be referred to as "frontward", "front side", the negative direction of the x axis may be referred to as "rearward", "rear side", the positive direction of the y axis may be referred to as "right", "rightward", the negative direction of the y axis may be referred to as "left", "leftward", the positive direction of the z axis may be referred to as "above", "upper side", and the negative direction of the z axis may be referred to as "below", "lower side". It can therefore be said that the x axis extends in the longitudinal direction, the y axis extends in the horizontal direction, and the z axis extends in the vertical direction.

The housing 100 has a shape of a hollow box. Inside the housing 100 is provided a circuit (not shown) for executing the functions of the electronic appliance 1000. An opening 110 is provided on the front side of the housing 100, and the opening 110 is covered with a front plate 200 having a plate-like shape. A securing part 210, which is a recess in which an antenna module 300 can be secured from the front side, is provided in the center of the front surface of the front plate 200. The structure of the antenna module 300 will be described later. A communication board 400 is mounted on the front side of the antenna module 300. The circuit for executing communication in wireless LAN and Bluetooth (registered trademark) is mounted on the communication board 400. The communication board 400 is covered by a front cover 500 from the front side.

Figure 3:
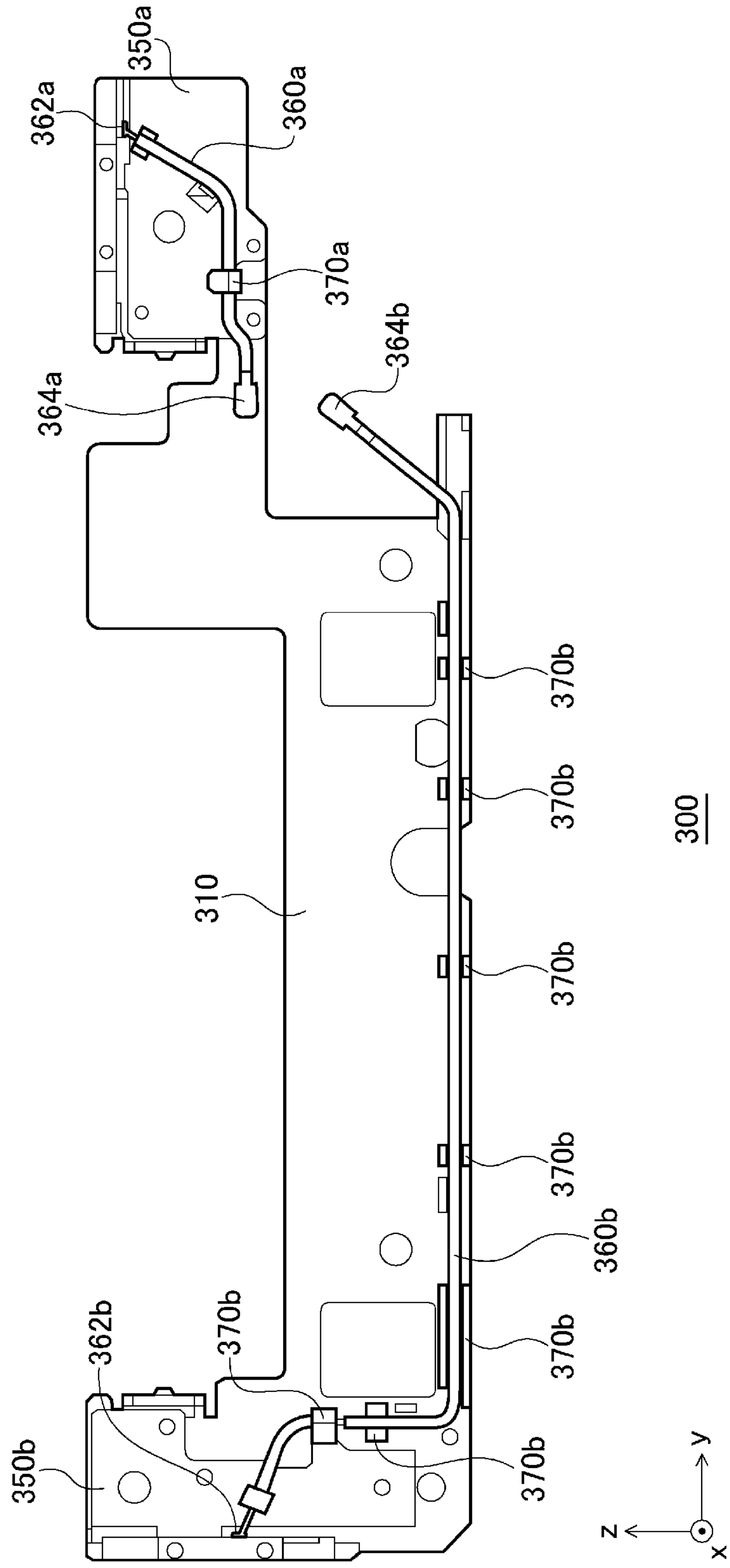
FIG. 3 is a front view showing the structure of the antenna module of FIG. 1.

FIG. 3 is a front view showing the structure of the antenna module 300. A resin plate 310 has a shape more elongated in the horizontal direction than in the vertical direction. The resin plate 310 can be mounted on the securing part 210 (FIG. 1) of the front plate 200 from the front side. A first antenna 350*a* is provided at the right end of the front surface of the resin plate 310. The first antenna 350*a* and the communication board 400 (FIG. 1) are connected by a first cable 360*a*. More specifically, a first cable connection part 362*a* and a first cable terminal 364*a* are provided at the ends of the first cable 360*a*. The first cable connection part 362*a* is is connected to the first antenna 350*a*. The first cable terminal 364*a* is connected to the communication board 400. The first cable 360*a* is mounted on a first mounting bracket 370*a* between the first cable connection part 362*a* and the first cable terminal 364*a*. The detail of the first mounting bracket 370*a* will be described later.

A second antenna 350*b* is provided at the left end on the front surface of the resin plate 310. The second antenna 350*b* and the communication board 400 (FIG. 1) are connected by a second cable 360*b*. More specifically, a second cable connection part 362*b* and a second cable terminal 364*b* are provided at the ends of the second cable 360*b*. The second cable connection part 362*b* is connected to the second antenna 350*b*. The second cable terminal 364*b* is connected to the communication board 400. The second cable 360*b* is mounted on a second mounting bracket 370*b* between the second cable connection part 362*b* and the second cable terminal 364*b*. The detail of the second mounting bracket 370*b* will be described later.

Figure 4A:
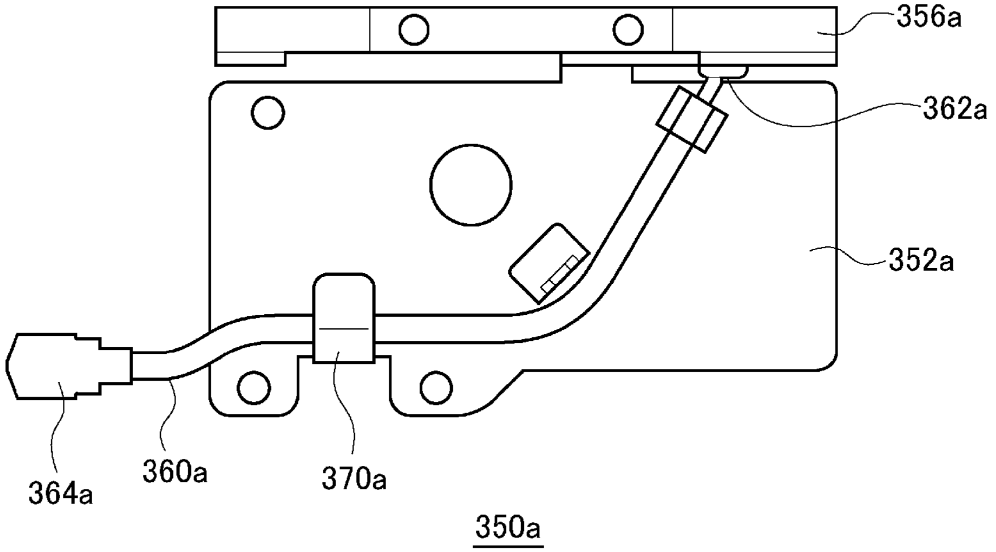
FIGS. 4A-4B show the structure of the first antenna of FIG. 3.
Figure 4B:
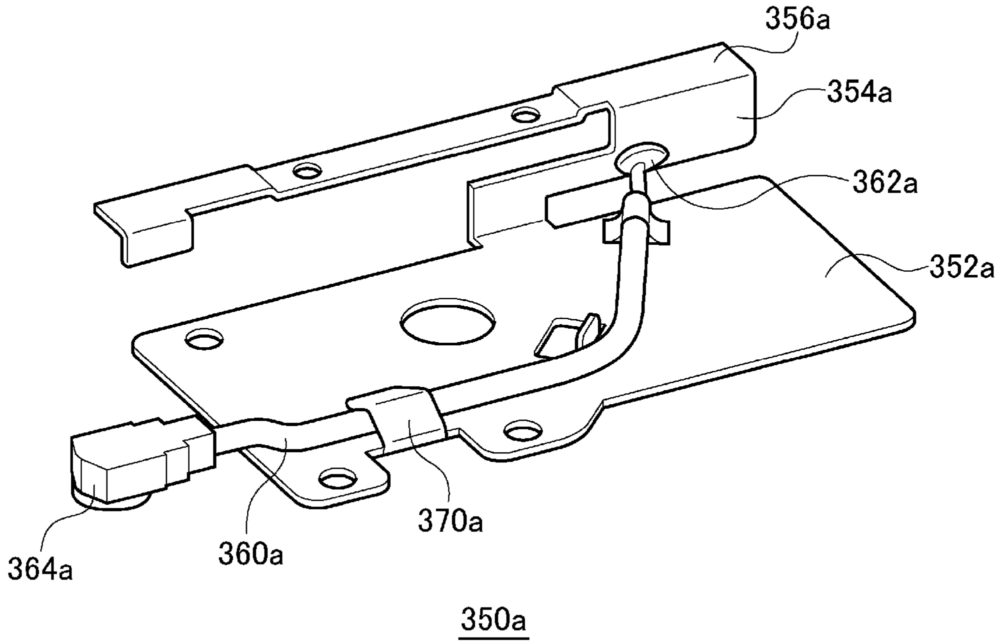

FIGS. 4A-4B show the structure of the first antenna 350*a*. FIG. 4A is a front view of the first antenna 350*a*, and FIG. 4B is a perspective view of the first antenna 350*a*. A first ground plate 352*a* in the first antenna 350*a* is a plate connected to the front surface of the resin plate 310. A first upright wall 354*a* is provided to stand from the first ground plate 352*a* toward the front side. The first cable connection part 362*a* is provided on the first upright wall 354*a*. Further, a first radiation plate 356*a* is connected to the first upright wall 354*a*, and the first radiation plate 356*a* is provided substantially parallel to the first ground plate 352*a*. The first ground plate 352*a*, the first upright wall 354*a*, and the first radiation plate 356*a* are, for example, manufactured by punching one metal plate. The first mounting bracket 370*a* is provided on the first ground plate 352*a*. In this case, the number of the first mounting brackets 370*a* is one, but a plurality of first mounting brackets 370*a* may be provided. Further, the first mounting bracket 370*a* may be provided only on the first ground plate 352*a*, the first mounting bracket 370*a* may be provided only on the front surface of the resin plate 310, or the first mounting bracket 370*a* may be provided both on the first ground plate 352*a* and the front surface of the resin plate 310.

Figure 5A:
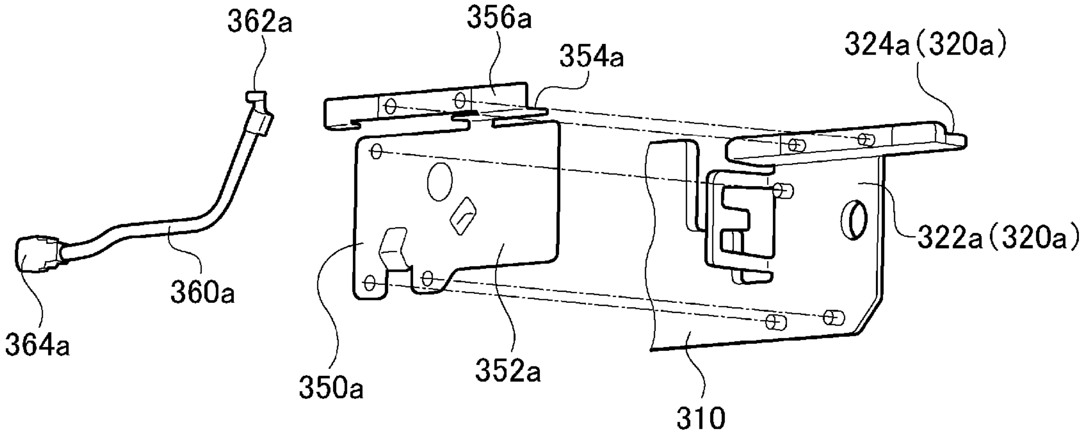
FIGS. 5A-5B show the connection of the resin plate of FIG. 3 to the first antenna.
Figure 5B:
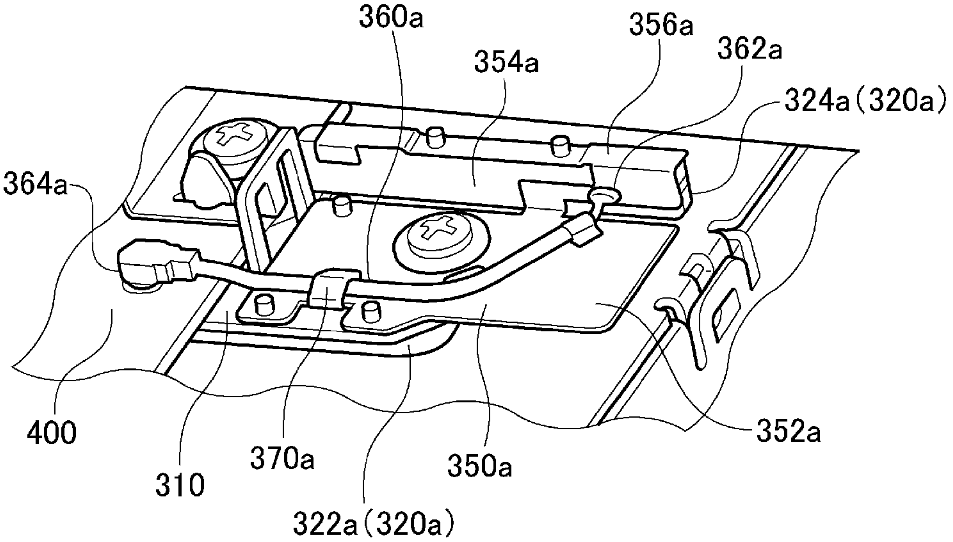

FIGS. 5A-5B show the connection of the resin plate 310 to the first antenna 350*a*. FIG. 5A is a perspective view before the connection, and FIG. 5B is a perspective view after the connection. A first connection part 320*a* is provided at the right end in the front surface of the resin plate 310. The first connection part 320*a* includes a first connection bottom 322*a* and a first connection support part 324*a*. The first connection bottom 322*a* is a flat surface in the front surface of the resin plate 310 having a shape that conforms to the first ground plate 352*a*. The first connection support part 324*a* projects in a form that conforms to the first upright wall 354*a* and the first radiation plate 356*a*. The first antenna 350*a* is connected to the resin plate 310 by setting the first ground plate 352*a* in the first connection bottom 322*a* and supporting the first upright wall 354*a* and the first radiation plate 356*a* by the first connection support part 324*a*.

Figure 6A:
FIGS. 6A-6B show the structure of the second antenna of FIG. 3.
Figure 6B:
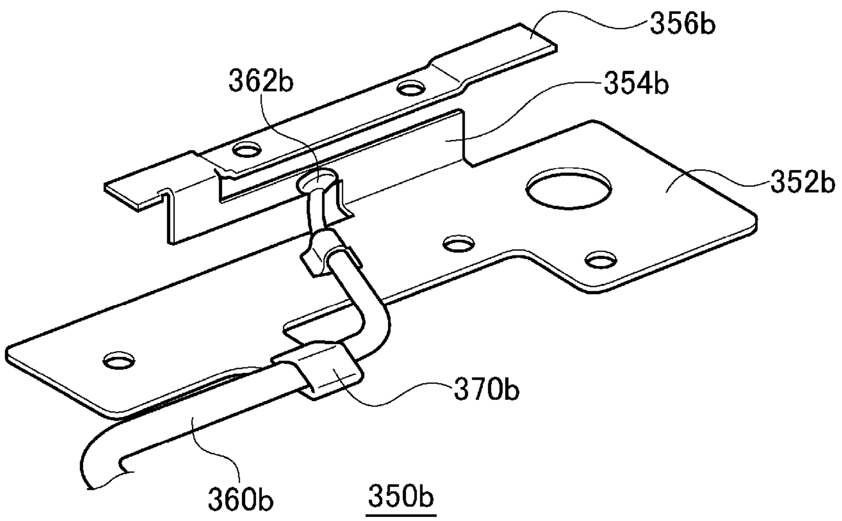

FIGS. 6A-6B show the structure of the second antenna 350*b*. FIG. 6A is a front view of the second antenna 350*b*, and FIG. 6B is a perspective view of the second antenna 350*b*. A second ground plate 352*b* in the second antenna 350*b* is a plate connected to the front surface of the resin plate 310. A second upright wall 354*b* is provided to stand from the second ground plate 352*b* toward the front side. The second cable connection part 362*b* is provided on the second upright wall 354*b*. Further, a second radiation plate 356*b* is connected to the second upright wall 354*b*, and the second radiation plate 356*b* is provided substantially parallel to the second ground plate 352*b*. The second ground plate 352*b*, the second upright wall 354*b*, and the second radiation plate 356*b* are, for example, manufactured by punching one metal plate. The second mounting bracket 370*b* is provided on the second ground plate 352*b*. In this case, the number of the second mounting brackets 370*b* is one, but a plurality of second mounting brackets 370*b* may be provided. Further, as shown in FIG. 3, a plurality of second mounting brackets 370*b* are also provided on the front surface of the resin plate 310. The second mounting bracket 370*b* may be provided only on one of the second ground plate 352*b* and on the front surface of the resin plate 310.

A second connection part 320*b* is provided at the left end in the front surface of the resin plate 310. The second connection part 320*b* includes a second connection bottom 322*b* and a second connection support part 324*b*. The second connection bottom 322*b* and the second connection support part 324*b* have shapes similar to those of the first connection bottom 322*a* and the first connection support part 324*a*, respectively. The second antenna 350*b* is connected to the resin plate 310 by setting the second ground plate 352*b* in the second connection bottom 322*b* and supporting the second upright wall 354*b* and the second radiation plate 356*b* by the second connection support part 324*b*.

The first mounting bracket 370*a* and the second mounting bracket 370*b* are provided on at least two of the front surface of the resin plate 310, the first ground plate 352*a*, and the second ground plate 352*b*. By providing the first mounting bracket 370*a* and the second mounting bracket 370*b*, a through hole may be produced in at least one of the front surface of the resin plate 310, the first ground plate 352*a*, and the second ground plate 352*b*. However, a through hole is not located in the front plate 200. Even if an interfering wave is produced in the antenna, therefore, the impact from the interfering wave in the circuit inside the housing is suppressed.

Figure 7A:
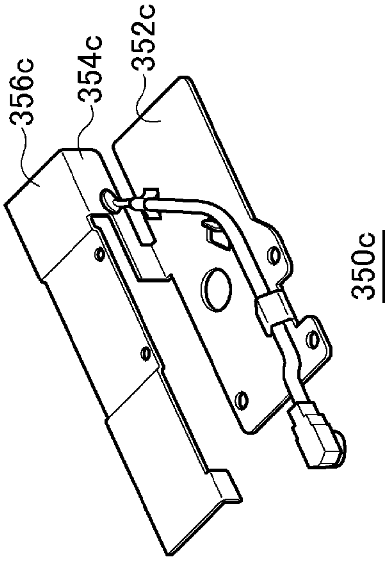
FIGS. 7A-7F show the structure of a third antenna through an eighth antenna.
Figure 7B:
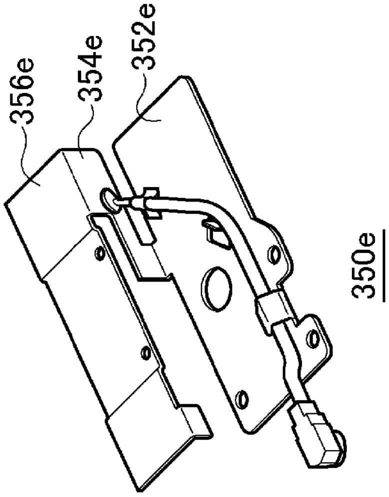
Figure 7C:
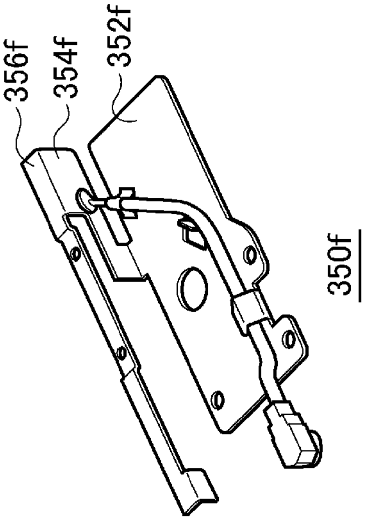

FIGS. 7A-7F show the structure of a third antenna 350*c* through an eighth antenna 350*h*. FIG. 7A shows the third antenna 350*c*, FIG. 7B shows the fifth antenna 350*e*, and FIG. 7C shows the sixth antenna 350*f*. The third antenna 350*c* includes a third ground plate 352*c*, a third upright wall 354*c*, and a third radiation plate 356*c*. The fifth antenna 350*e* includes a fifth ground plate 352*e*, a fifth upright wall 354*e*, and a fifth radiation plate 356*e*. The sixth antenna 350*f* includes a sixth ground plate 352*f*, a sixth upright wall 354*f*, and a sixth radiation plate 356*f*.

The third ground plate 352*c*, the fifth ground plate 352*e*, and the sixth ground plate 352*f* have the same shape as the first ground plate 352*a*. The third upright wall 354*c*, the fifth upright wall 354*e*, and the sixth upright wall 354*f* have the same shape as the first upright wall 354*a*. Therefore, the third antenna 350*c*, the fifth antenna 350*e*, and the sixth antenna 350*f* can be connected to the first connection part 320*a* in place of the first antenna 350*a*.

Meanwhile, the third radiation plate 356*c*, the fifth radiation plate 356*e*, the sixth radiation plate 356*f*, and the first radiation plate 356*a* have mutually different shapes. This causes the third antenna 350*c*, the fifth antenna 350*e*, the sixth antenna 350*f*, and the first antenna 350*a* to have mutually different directivity.

Figure 7D:
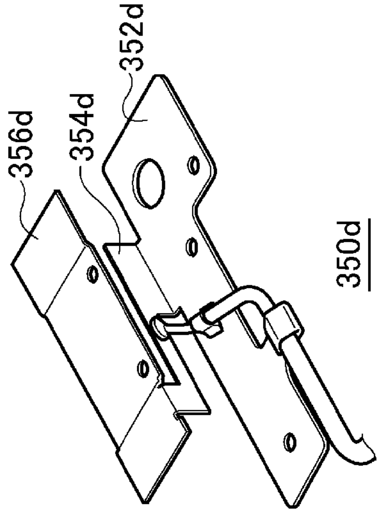
Figure 7E:
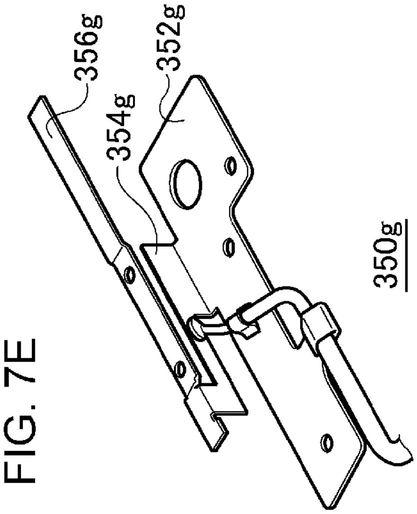
Figure 7F:
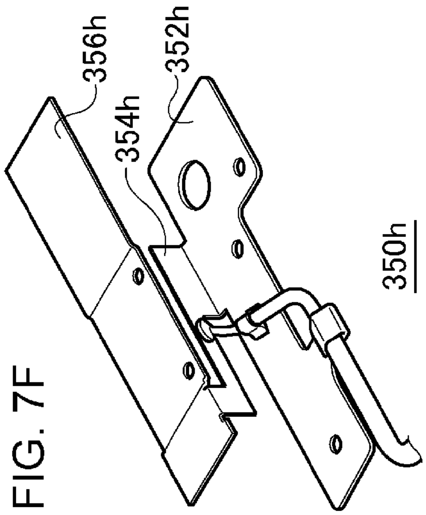

FIG. 7D shows the fourth antenna 350*d*, FIG. 7E shows the seventh antenna 350*g*, and FIG. 7F shows the eighth antenna 350*h*. The fourth antenna 350*d* includes a fourth ground plate 352*d*, a fourth upright wall 354*d*, and a fourth radiation plate 356*d*. The seventh antenna 350*g* includes a seventh ground plate 352*g*, a seventh upright wall 354*g*, and a seventh radiation plate 356*g*. The eighth antenna 350*h* includes an eighth ground plate 352*h*, an eighth upright wall 354*h*, and an eighth radiation plate 356*h*.

The fourth ground plate 352*d*, the seventh ground plate 352*g*, and the eighth ground plate 352*h* have the same shape as the second ground plate 352*b*. The fourth upright wall 354*d*, the seventh upright wall 354*g*, and the eighth upright wall 354*h* have the same shape as the second upright wall 354*b*. Therefore, the fourth antenna 350*d*, the seventh antenna 350*g*, and the eighth antenna 350*h* can be connected to the second connection part 320*b* in place of the second antenna 350*b*.

Meanwhile, the fourth radiation plate 356*d*, the seventh radiation plate 356*g*, the eighth radiation plate 356*h*, and the second radiation plate 356*b* have mutually different shapes. This causes the fourth antenna 350*d*, the seventh antenna 350*g*, the eighth antenna 350*h*, and the second antenna 350*b* to have mutually different directivity.

According to the embodiment of the present disclosure, the first mounting bracket and the second mounting bracket are provided in a module in which the first antenna, the second antenna, the first cable, and the second cable are mounted and integrated on the resin plate. Therefore, the front plate is left free of through holes. Further, since the front plate is left free of through holes, the impact from the interfering wave on the housing interior can be reduced. Further, since the first antenna, the second antenna, the first cable, and the second cable are mounted on the resin module and turned into a module, strength of the antenna can be increased. Further, the first antenna, the second antenna, the first cable, and the second cable are mounted on the resin module and turned into a module, the module can be transported in one package.

Further, since the first antenna, the second antenna, the first cable, and the second cable are mounted on the resin module and turned into a module, a wiring work for wiring the cable after the antenna module is mounted on the housing is made unnecessary. Further, since the first antenna, the second antenna, the first cable, and the second cable are mounted on the resin module and turned into a module, the antenna performance can be evaluated in the antenna module alone. Further, since the communication board is mounted on the front side of the antenna module, the length of the cable for connecting the antenna and the communication board can be reduced.

Further, since the third ground plate has the same shape as the first ground plate, and the third radiation plate has a shape different from that of the first radiation plate, the third antenna having a directivity different from that of the first antenna can be used in place of the first antenna. Further, since the fourth ground plate has the same shape as the second ground plate, and the fourth radiation plate has a shape different from that of the second radiation plate, the fourth antenna having a directivity different from that of the second antenna can be used in place of the second antenna.

One embodiment of the present disclosure is summarized below. An antenna module according to an embodiment of the present disclosure includes: a resin plate structured and arranged to be mounted on a front plate of a housing from a front side; a first antenna and a second antenna provided on a front surface of the resin plate; a first cable that connects the first antenna and a communication board; a first mounting bracket on which the first cable is mounted; a second cable that connects the second antenna and the communication board; and a second mounting bracket on which the second cable is mounted. The first antenna includes: a first ground plate connected to the front surface of the resin plate; a first upright wall provided to stand from the first ground plate toward the front side; and a first radiation plate connected to the first upright wall. The second antenna includes: a second ground plate connected to the front surface of the resin plate; a second upright wall provided to stand from the second ground plate toward the front side; and a second radiation plate connected to the second upright wall. The first mounting bracket is provided on at least one of the front surface of the resin plate and the first ground plate, and the second mounting bracket is provided on at least one of the front surface of the resin plate and the second ground plate.

According to this embodiment, the first mounting bracket and the second mounting bracket are provided in a module in which the first antenna, the second antenna, the first cable, and the second cable are mounted and integrated on the resin plate. Therefore, the front plate is left free of through holes, and the impact from the interfering wave on the housing interior can be reduced.

The antenna module may further include, on the front surface of the resin plate, a first connection part to which the first ground plate is structured and arranged to be connected. A third antenna may be structured and arranged to be connected to the first connection part in place of the first antenna, and the third antenna may include: a third ground plate connected to the first connection part; a third upright wall provided to stand from the third ground plate toward the front side; and a third radiation plate connected to the third upright wall. The third ground plate may have the same shape as the first ground plate, and the third radiation plate may have a shape different from that of the first radiation plate. In this case, since the third ground plate has the same shape as the first ground plate, and the third radiation plate has a shape different from that of the first radiation plate, the third antenna having a directivity different from that of the first antenna can be used in place of the first antenna.

The antenna module may further include, on the front surface of the resin plate, a second connection part to which the second ground plate is structured and arranged to be connected. A fourth antenna may be structured and arranged to be connected to the second connection part in place of the second antenna, and the fourth antenna may include: a fourth ground plate connected to the second connection part; a fourth upright wall provided to stand from the fourth ground plate toward the front side; and a fourth radiation plate connected to the fourth upright wall. The fourth ground plate may have the same shape as the second ground plate, and the fourth radiation plate may have a shape different from that of the second radiation plate. In this case, since the fourth ground plate has the same shape as the second ground plate, and the fourth radiation plate has a shape different from that of the second radiation plate, the fourth antenna having a directivity different from that of the second antenna can be used in place of the second antenna.

The communication board is mounted on a front side of the antenna module. Further, since the communication board is mounted on the front side of the antenna module, the length of the cable for connecting the antenna and the communication board can be reduced.

Described above is an explanation of the present disclosure based on the embodiment. The embodiment is intended to be illustrative only and it will be understood by those skilled in the art that various modifications to constituting elements and processes could be developed and that such modifications are also within the scope of the present disclosure.

In the antenna module 300 of the embodiment, two antennas 350 are mounted on the resin plate 310. Alternatively, three or more antennas 350 may be mounted on the resin plate 310. According to this variation, the flexibility in configuration can be improved.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2022-024207, filed on Feb. 18, 2022, the entire contents of which are incorporated herein by reference.

What is claimed is:

1. An antenna module comprising:

a resin plate structured and arranged to be mounted on a front plate of a housing from a front side;

a first antenna and a second antenna provided on a front surface of the resin plate;

a first cable that connects the first antenna and a communication board;

a first mounting bracket on which the first cable is mounted;

a second cable that connects the second antenna and the communication board; and a second mounting bracket on which the second cable is mounted, wherein the first antenna includes:

a first ground plate connected to the front surface of the resin plate;

a first upright wall provided to stand from the first ground plate toward the front side; and a first radiation plate connected to the first upright wall, the second antenna includes:

a second ground plate connected to the front surface of the resin plate;

a second upright wall provided to stand from the second ground plate toward the front side; and a second radiation plate connected to the second upright wall, the first mounting bracket is provided on at least one of the front surface of the resin plate and the first ground plate, and the second mounting bracket is provided on at least one of the front surface of the resin plate and the second ground plate.

2. The antenna module according to claim 1, further comprising:

on the front surface of the resin plate, a first connection part to which the first ground plate is structured and arranged to be connected, wherein a third antenna is structured and arranged to be connected to the first connection part in place of the first antenna, the third antenna includes:

a third ground plate connected to the first connection part;

a third upright wall provided to stand from the third ground plate toward the front side; and a third radiation plate connected to the third upright wall, the third ground plate has the same shape as the first ground plate, and the third radiation plate has a shape different from that of the first radiation plate.

3. The antenna module according to claim 2, further comprising:

on the front surface of the resin plate, a second connection part to which the second ground plate is structured and arranged to be connected, wherein a fourth antenna is structured and arranged to be connected to the second connection part in place of the second antenna, the fourth antenna includes:

a fourth ground plate connected to the second connection part;

a fourth upright wall provided to stand from the fourth ground plate toward the front side; and a fourth radiation plate connected to the fourth upright wall, the fourth ground plate has the same shape as the second ground plate, and the fourth radiation plate has a shape different from that of the second radiation plate.

4. The antenna module according to claim 1, wherein the communication board is mounted on a front side of the antenna module.

5. The antenna module according to claim 2, wherein the communication board is mounted on a front side of the antenna module.

6. The antenna module according to claim 3, wherein the communication board is mounted on a front side of the antenna module.

* * * * *